United States Patent [19]
Hertig

[11] 4,013,893
[45] Mar. 22, 1977

[54] OPTICAL BAR CODE SCANNING DEVICE

[75] Inventor: Urs W. Hertig, Auburn, N.Y.

[73] Assignee: Welch Allyn, Inc., Skaneateles Falls, N.Y.

[22] Filed: Aug. 7, 1975

[21] Appl. No.: 602,587

[52] U.S. Cl. .................. 250/568; 235/61.11 E; 250/227

[51] Int. Cl.² .................................. G06K 7/10

[58] Field of Search .......... 250/568, 569, 566, 578, 250/231 R, 227; 235/61.11 E

[56] References Cited
UNITED STATES PATENTS

| | | | |
|---|---|---|---|
| 2,948,817 | 8/1960 | Carpenter | 250/231 |
| 3,218,909 | 11/1965 | Fain | 250/235 X |
| 3,714,432 | 1/1973 | Jalink, Jr. | 250/231 X |
| 3,798,458 | 3/1974 | Buckingham et al. | 250/569 |
| 3,906,220 | 9/1975 | Delingat | 250/227 |

*Primary Examiner*—David C. Nelms
*Attorney, Agent, or Firm*—Bruns & Jenney

[57] ABSTRACT

An optical bar code scanning device for high data density bar code reading. The device utilizes a two channel arrangement for directing light reflected from the bar code being read onto two photodetectors in predetermined proportionate amounts. With a two channel system, it is possible to detect a bar edge independent of print contrast variations, resolution modulation or change of illumination by comparing the optical signal of one channel with the optical signal of the other. The bar edge is represented by the crossover point of the normalized outputs of the two channels.

9 Claims, 10 Drawing Figures

OPTICAL BAR CODE SCANNING DEVICE

BACKGROUND OF THE INVENTION

This invention relates generally to optical scanners, and has particular reference to a novel two channel optical scanning device for reading bar codes of high data density.

Existing hand held scanning devices read the varying amounts of light reflected from the various different elements of a bar code with a photodetector which coacts with an optical system that provides the required resolution to defect the smallest element of the bar code. The information that is encoded in the succession of bar code elements appears at the photodetector output as an electric signal of changing amplitude and variable width as the scanner is moved across the bar code.

The width of a light or dark code element is expressed in the time period between the mean value of the detector output change and the mean value of the following output change. Since the slope and amplitude of the detector output change are functions of the scanner characteristics and bar code print contrast, it is impossible to determine ahead of the following output change the mean value of said change. It is therefore virtually impossible to produce an electrical square wave signal that accurately expresses the width of a given bar code element with previously developed hand held scanners in a real time process.

Various electronic circuits such as slope detectors and controlled threshold comparators have been developed to process the signal of prior art scanners reducing the errors caused by scanner and code characteristics. However, with the exception of some relatively complex and expensive systems not operating in a real time mode, the prior art hand held scanning devices are generally not suitable for high data density bar code reading to the best of the applicant's knowledge.

SUMMARY OF THE INVENTION

The present invention is directed toward an optical bar code scanning device that is particularly adapted for accurately reading high data density bar codes. The device utilizes a two channel arangement including dual photodetectors and means are provided for directing light that is reflected from the bar code being read onto the detectors in predetermined proportionate amounts. Preferably, the arrangement is such that one of the detectors can receive no more reflected light than would be received from a code bar that is twice the width of the smallest bar code element while the other detector can receive no more reflected light than would be received from the smallest bar code element.

With a two channel system, it is possible to detect a bar edge independent of print contrast variations, resolution modulation or change of illumination by comparing the optical signal of one channel with the optical signal of the other. The bar edge is represented by the crossover point of the normalized outputs of the two channels.

In one form of the invention, the photodetectors are concentrically disposed with respect to one another. In another form of the invention, the photodetectors are physically separated and coact with two bundles of optical fibers, the bundles being concentrically arranged at one end to receive the light reflected from the bar code being read and having their other ends spaced apart and confronting the two detectors. In still another form of the invention, the photodetectors are physically separated and coact with a beam splitter that divides the reflected light into two paths. In the latter form, the detectors are respectively positioned in the two paths and aperture means are also positioned in the paths to control the amount of light that is received by each detector.

DESCRIPTION OF THE PREFERRED EMBODIMENTS

Figure 1:
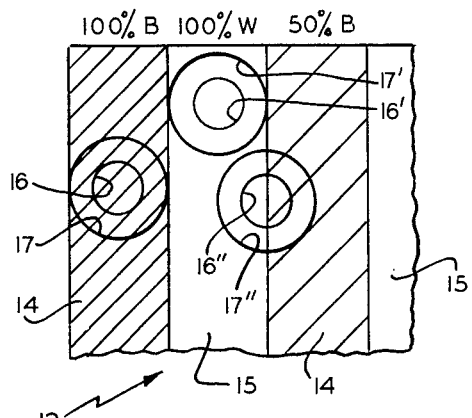
FIG. 1 is a fragmentary top plan view of a bar code with concentric circles diagrammatically representing the amount of reflected light that is received by the dual photodetectors.

Referring now to the drawings, and with particular reference to FIGS. 1–4, a portion of a bar code is generally indicated at 12 in FIG. 1, the code being comprised of a plurality of black code bar elements 14 and a plurality of white code bar elements 15. The concentric circles 16 and 17 that are superimposed upon the bar code for the purpose of illustration represent the amount of reflected light that can be received by the dual photodetectors in the scanning device to be described. Thus, the inner circle 16 represents the data channel of the device and it is arranged so that its photodetector can, at a maximum, receive no more reflected light than would be received from the smallest bar code element. The outer circle 17 represents the reference channel of the device and it is arranged so that its photodetector can, at a maximum, receive no more reflected light than would be received from a bar code section twice the width of the smallest bar code element.

In FIG. 1, the code bars 14 and 15 are all twice the minimum width for the particular code, and the diameters of circles 16 and 17 are the maximum permitted. It will be understood that in a normal bar code there will be black and white code bars of varying widths.

Figure 2:
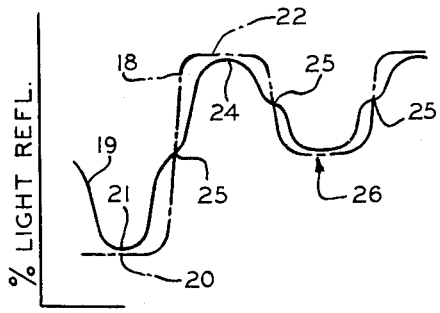
FIG. 2 is a plot of the normalized outputs of the photodetectors of a scanning device being moved across the bar code of FIG. 1.

As the scanning device is moved from left to right in a direction substantially perpendicular to the length of the code bars, the amounts of reflected light that are received by the data and reference channel photodetectors will vary. When the device is positioned over the first black code bar 14, the amount of reflected light that is received by both photodetectors, as represented by circles 16 and 17, will be the minimum possible as is indicated by the curves in FIG. 2. In FIG. 2, curve 18 corresponds to circle 16 and shows the normalized output of the data channel photodetector and curve 19 corresponds to circle 17 and shows the normalized output of the photodetector for the reference channel. The two photodetector outputs must be normalized to equate the amplitudes of the curves; otherwise the reference channel as represented by circle 17 would have substantially greater amplitudes because it has a substantially larger light receiving area.

When the scanning device is positioned over the first black code bar 14 as indicated by circles 16 and 17 in FIG. 1, the bottom or low reflectance point 20 for curve 18 will be flat because circle 16 has a significant amount of travel between the edges of bar 14. Circle 17, on the other hand, has only one position in which it is squarely between the edges of the code bar and upon the smallest continued movement to the right the amount of light reflected immediately increases because a portion of the circle moves over a white code bar. Curve 19, therefore, is not flat at its bottom or low reflectance point 21 but rather makes a relatively quick change in direction as shown. Even in the one position in which circle 17 is squarely between the edges of code bar 14, it may reflect more light than the data channel circle 16 because of resolution modulation or color diffusion near the edges of the bar.

When the scanning device is moved over the first white code bar 15 as indicated by circles 16' and 17' in FIG. 1, the top or high reflectance point 22 for curve 18 will again be flat because of the significant amount of travel of the data channel circle within the code bar. The high reflectance point 24 for curve 19 will not be flat but will be similar to its low reflectance point 21 for the reason explained above. In this connection, it should be noted that the illustrative circles 16' and 17' should realistically be shown as colinear with circles 16,17 and 16",17" but are offset above them for clarity.

With the high and low points of curve 18 being flattened and the high and low points of curve 19 being sharply rounded, curve 18 rises and falls more steeply than curve 19 with the result that the two curves cross after each change of direction as shown. These crossover points 25 accurately represent the edges of the code bars 14 and 15 and the distances between adjacent points 25 represent the true widths of the bars.

The circles 16" and 17" represent the scanning device in a position in which it is half over a white bar 15 and half over a black bar 14, and with the scanning device of the invention this position also coincides with a crossover point 25 as shown in FIG. 2. A scanning device with but a single channel in exactly the same position might not read the bar edge accurately because of print contrast variations.

In FIG. 1 it will be noted that the designation 100% B(lack) appears above the first black code bar 14 whereas the designation 50% B(lack) appears above the second black bar. This is an extreme example for illustration of a print contrast variation or color shade variation and it is reflected in a decrease in the amplitude of curves 18 and 19 as indicated at 26 in FIG. 2.

Figure 3:
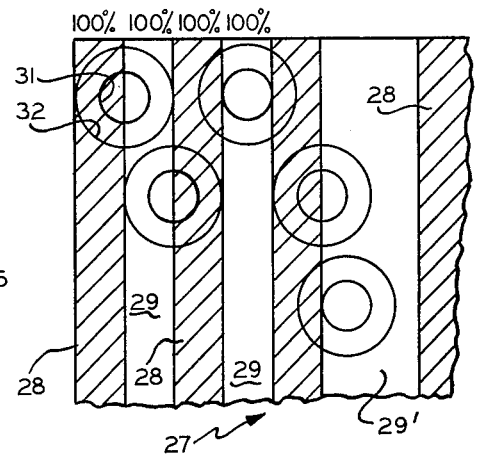
FIG. 3 is a view of a bar code similar to FIG. 1.

FIG. 3 illustrates a portion of another bar code 27 wherein black bars 28 and white bars 29 represent code bar elements of the minimum width for the particular code. The concentric circles 31 and 32 that are superimposed upon the bar code represent the amount of reflected light that can be received by the data and reference channels, respectively, of the scanning device. In this illustration, the circle areas are the maximum permitted, i.e. the inner circle 31 can receive no more reflected light than would be received from the smallest bar code element and the outer circle 32 can receive no more reflected light than would be received from a code bar twice the width of the smallest code bar element.

Figure 4:
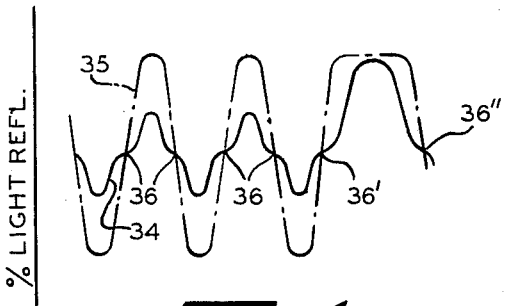
FIG. 4 is a plot similar to FIG. 2 for a scanning device being moved across the bar code of FIG. 3.

As the two channel scanning device of the invention is moved from left to right across the bar code 27, the amount of reflected light that is received by the dual photodetectors will be indicated by the curves 34 and 35 of FIG. 4, wherein curve 35 corresponds to circle 31 and represents the normalized output of the data channel photodetector and curve 34 corresponds to circle 32 and represents the normalized output of the photodetector for the reference channel. As in FIG. 2, curves 34,35 generate crossover points 36 that accurately represent the edges of the code bars and the distances between adjacent points 36 represent the true widths of the bars. In this connection, white bar 29' is wider than the minimum and the curves of FIG. 4 reflect the greater width of this bar by the distance between crossover points 36' and 36".

Figure 5:
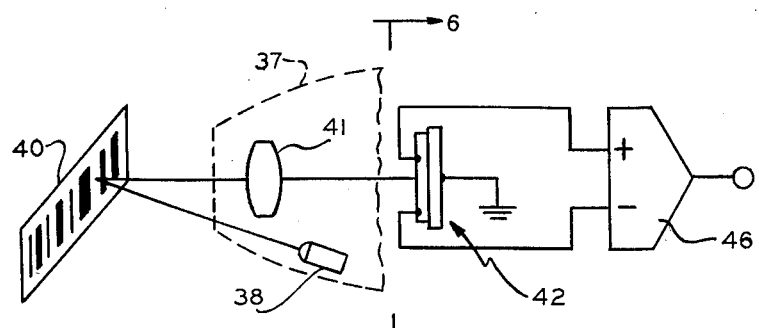
FIG. 5 is a diagrammatic illustration of a scanning device embodying the invention.

Reference is now made to FIG. 5 which is a diagrammatic illustration of a two channel scanning device embodying the invention. The device includes a suitable housing 37, shown fragmentarily by phantom lines, and positioned in the housing is a light source such as a lamp 38 for illuminating a bar code 40 and suitable optical means 41 for gathering the light reflected from the bar code. The optical means directs the reflected light onto a dual photodetector arrangement located in the housing and indicated generally at 42. This arrangement as best shown in FIG. 6 comprises concentrically arranged inner and outer photocells 44,45.

In accord with the preceding description, the inner cell 44 functions as the data channel of the device and is dimensioned so that it can receive no more reflected light than would be received from the smallest bar code element. The outer cell 45 functions as the reference channel of the device and is dimensioned so that it can receive no more reflected light than would be received from a code bar twice the width of the smallest bar code element.

The outputs of detectors 44,45 are normalized by suitable electronic means and fed into a comparator 46. The comparator senses the two normalized detector outputs and produces an output change at each intersection of the outputs as above described, the comparator signal occurring precisely at the edge of the bar code element regardless of code contrast characteristics, scanning speed and illumination variations. With respect to the latter, variations in internal or external illumination have no effect on the integrity of the device because both channels are affected in the same manner.

Figure 6:
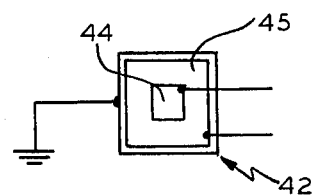
FIG. 6 is a view of the dual photodetector portion of the device of FIG. 5 taken on line 6—6 thereof.

While the amount of reflected light that can be received by the dual photodetectors are represented by concentric circles 16,17 and 31,32 in FIGS. 1 and 3, FIG. 6 shows that the detectors need not have a circular shape. They can in fact have any suitable configuration as long as they are dimensioned so that they can receive no more reflected light than as set forth above.

Figure 7:
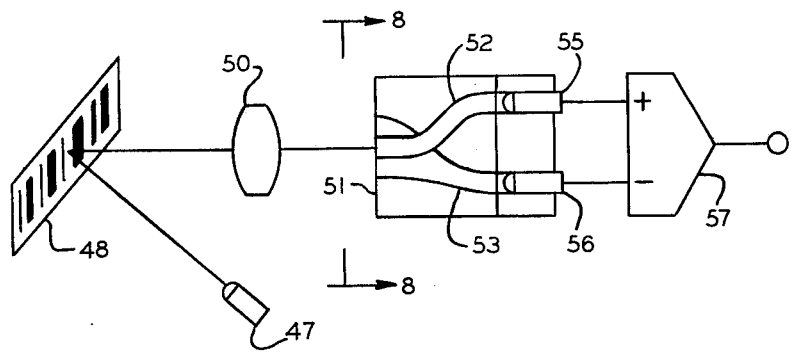
FIG. 7 is a diagrammatic illustration of another form of the scanning device of the invention.

FIG. 7 is a diagrammatic illustration of another form of the scanning device of the invention. In this form, a suitable housing (not shown) has a light source 47 for illuminating a bar code 48 and optical means 50 for gathering the light reflected from the code, this part of the device being like the scanner of FIGS. 5 and 6. The optical means directs the reflected light onto the front face 51 of two concentrically arranged bundles 52,53 of optical fibers, FIG. 8. At their other ends, the bundles 52,53 are spaced apart and terminate in adjacent, confronting relation to photodetectors 55,56.

Figure 8:
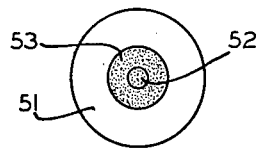
FIG. 8 is a view of the portion of the device of FIG. 7 taken on line 8—8 thereof.

In accord with the previous description, the inner bundle 52, FIG. 8, functions with its detector 55 as the data channel of the device and is dimensioned so that it can receive no more reflected light than would be received from the smallest code bar element. The outer bundle 53 functions with its detector 56 as the reference channel of the device and is dimensioned so that it can receive no more reflected light than would be received from a code bar twice the width of the smallest bar code element. The normalized outputs of detectors 55 and 56 are fed into a comparator 57 which operates in the manner described for comparator 46 in FIG. 5.

Figure 9:
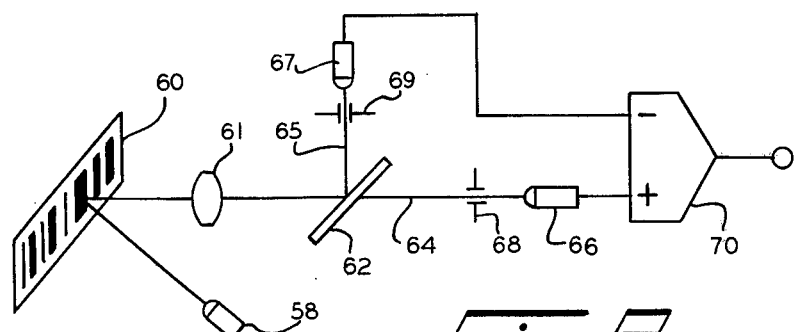
FIG. 9 is a diagrammatic illustration of another form of the scanning device of the invention.

FIG. 9 is a diagrammatic illustration of another form of the scanning device of the invention. In this form, a suitable housing (not shown) has a light source 58 for illuminating a bar code 60 and optical means 61 for gathering the light reflected from the code. The optical means directs the light at a beam splitting means 62 which divides it into a transmitted channel 64 and a reflected channel 65, and the light in these channels is received by photodetectors 66 and 67, respectively. Located in the channels 64 and 65 are aperture forming means 68 and 69, respectively, which have the same configuration but are a different size.

In accord with the previous description, channel 64 functions with its detector 66 as the data channel of the device and its aperture means 68 is dimensioned so that detector 66 can receive no more reflected light than would be received from the smallest bar code element. Channel 65 functions with its detector 67 as the reference channel of the device and its aperture means 69 is dimensioned so that detector 67 can receive no more light than would be received from a code bar twice the width of the smallest bar code element. The normalized outputs of detectors 66 and 67 are fed into a comparator 70 which operates in the manner described for comparator 46 in FIG. 5.

Figure 10:
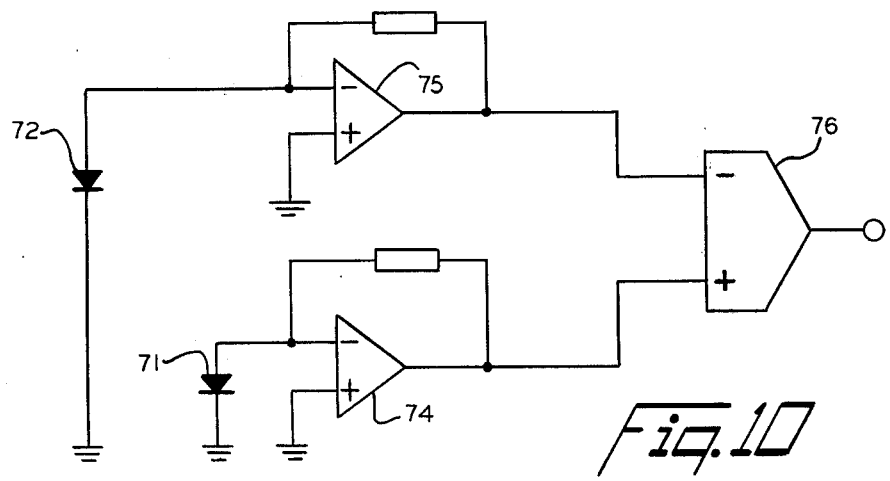
FIG. 10 is a representative circuit diagram for the scanning device of the invention.

FIG. 10 illustrates a representative circuit diagram for the scanning devices of the invention. In this circuit the outputs of photodetectors 71,72 are connected through amplifiers 74,75 respectively to a comparator 76. The pair of detectors 71,72 can be any one of the pairs of detectors in FIGS. 5, 7 and 9, and the comparator 76 can be any one of the comparators in these Figures. The amplifiers 74,75 amplify the photodetector signals for high resolution and low contrast bar code reading.

From the foregoing description it will be apparent that the invention provides novel optical bar code scanning device constructions that are particularly advantageous for reading bar codes of high data density. As will be understood by whose familiar with the art, the invention may be embodied in other specific forms without departing from the spirit or essential characteristics thereof.

I claim:

1. In an optical bar code scanning device for high data density bar code reading, the bar code comprising a plurality of bar code elements: means for illuminating the bar code to be read so that light is reflected therefrom, a pair of photodetectors, means for gathering the reflected light so that it falls on the photodetectors, said photodetectors being arranged in the device so that one of them can receive no more reflected light than would be received from a code bar that is twice the width of the smallest bar code element, the other of said photodetectors being arranged so that it receives less reflected light by a predetermined amount than is received by said first mentioned photodetector, and means for comparing the outputs of the two photodetectors.

2. A bar code scanning device as defined in claim 1 wherein said other photodetector is arranged so that it can receive no more reflected light than would be received from the smallest bar code element.

3. A bar code scanning device as defined in claim 1 wherein said pair of photodetectors are concentrically arranged.

4. A bar code scanning device as defined in claim 1 wherein said pair of photodetectors are arranged to coact with two bundles of optical fibers, the bundles being concentrically arranged at one end thereof to receive the reflected light and being spaced apart at their other ends, said other ends respectively terminating in adjacent confronting relation to the photodetectors to direct a portion of the reflected light at each.

5. A bar code scanning device as defined in claim 1 together with beam splitting means to divide the reflected light into two paths, the pair of photodetectors being respectively positioned in said two light paths, and aperture means in each light path between the beam splitting means and photodetector to control the amount of light that is received by the latter.

6. In an optical bar code scanning device for reading bar codes of high data density, the bar code comprising a plurality of print contrasting code bar elements: a housing, means in the housing for illuminating the bar code to be read so that light is reflected therefrom, a pair of photodetectors in the housing, optical means in the housing for gathering the reflected light so that it falls on the photodetectors, said photodetectors being arranged in the device so that one of them can receive no more reflected light than would be received from the smallest bar code element, the other of said photodetectors being arranged in the device so that it can receive no more reflected light than would be received from a code bar that is twice the width of the smallest bar code element, and comparator means for comparing the outputs of the photodetectors.

7. A bar code scanning device as defined in claim 6 wherein said pair of photodetectors are concentrically arranged.

8. A bar code scanning device as defined in claim 6 wherein said pair of photodetectors are arranged to coact with two bundles of optical fibers, the bundles being concentrically arranged at one end thereof to receive the reflected light and being spaced apart at their other ends, said other ends respectively terminating in adjacent confronting relation to the photodetectors to direct a portion of the reflected light at each.

9. A bar code scanning device as defined in claim 6 together with beam splitting means to divide the reflected light into two paths, the pair of photodetectors being respectively positioned in said two light paths, and aperture means in each light path between the beam splitting means and photodetector to control the amount of light that is received by the latter.

* * * * *